(12) United States Patent
Vudathu et al.

(10) Patent No.: US 12,481,968 B2
(45) Date of Patent: Nov. 25, 2025

(54) SYSTEMS AND METHODS FOR PROVISIONING FUNDING CARD NUMBERS TO THIRD PARTY WALLETS

(71) Applicant: JPMORGAN CHASE BANK, N.A., New York, NY (US)

(72) Inventors: Raghuram Vudathu, Downingtown, PA (US); Sridhar Aravamudhan, Middletown, DE (US); David Christopher Carey, Middletown, DE (US); Shruti K. Patel, New York, NY (US); Janice Yoke Leng Wong, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 385 days.

(21) Appl. No.: 18/332,226

(22) Filed: Jun. 9, 2023

(65) Prior Publication Data

US 2023/0316265 A1  Oct. 5, 2023

Related U.S. Application Data

(62) Division of application No. 16/786,812, filed on Feb. 10, 2020, now Pat. No. 11,704,662.

(51) Int. Cl.
*G06Q 20/08* (2012.01)
*G06Q 20/12* (2012.01)
(Continued)

(52) U.S. Cl.
CPC ......... *G06Q 20/0855* (2013.01); *G06Q 20/12* (2013.01); *G06Q 20/3674* (2013.01); *G06Q 20/40975* (2013.01); *G06Q 20/40* (2013.01)

(58) Field of Classification Search
CPC .............. G06Q 20/0855; G06Q 20/12; G06Q 20/3672; G06Q 20/3674; G06Q 20/38215;
(Continued)

(56) References Cited

U.S. PATENT DOCUMENTS 9,819,672 B1   11/2017  Machani
2006/0006226 A1  1/2006  Fitzgerald et al.
(Continued)

FOREIGN PATENT DOCUMENTS

CN    106327172 A  *  1/2017  ....... G06Q 20/40975

OTHER PUBLICATIONS

International Search Report, dated May 28, 2021, from corresponding International Application No. PCT/US2021/017408.
(Continued)

*Primary Examiner* — John W Hayes
*Assistant Examiner* — Odajo Getachew
(74) *Attorney, Agent, or Firm* — GREENBERG TRAURIG LLP

(57) ABSTRACT

Systems, methods, and devices for provisioning funding card numbers to merchant wallets are disclosed. In one embodiment, in an information processing apparatus comprising at least one computer processor, a method for provisioning funding card numbers to third party wallets may include: (1) authenticating a customer using an electronic device; (2) redirecting the customer to a third-party website; (3) receiving, from the third-party website and via a first API, a request for funding primary account numbers (FPANs) associated with the customer; (4) providing the third-party website with a plurality of FPAN identifiers for FPANs associated with the customer; (5) receiving, from the third-party website and via a second API, a request for a FPAN associated with a selected FPAN identifier; (6)
(Continued)

encrypting the FPAN associated with the selected FPAN identifier; and (7) communicating the encrypted FPAN to the third-party website.

18 Claims, 4 Drawing Sheets

(51) Int. Cl.
    *G06Q 20/36*     (2012.01)
    *G06Q 20/40*     (2012.01)

(58) Field of Classification Search
    CPC .. G06Q 20/3829; G06Q 40/02; G06Q 50/265; G06Q 2220/00; G06F 21/445; H04L 9/3213; H04L 63/0435
    USPC .......................................................... 705/76
    See application file for complete search history.

(56) References Cited

U.S. PATENT DOCUMENTS

| | | | |
|---|---|---|---|
| 2006/0036500 A1* | 2/2006 | Ota | G07F 7/1008 705/16 |
| 2013/0246261 A1 | 9/2013 | Purves et al. | |
| 2015/0040204 A1 | 2/2015 | Smales | |
| 2015/0088756 A1* | 3/2015 | Makhotin | G06Q 20/12 705/71 |
| 2015/0095238 A1* | 4/2015 | Khan | G06Q 20/12 705/71 |
| 2015/0254672 A1* | 9/2015 | Huesch | G06Q 20/306 705/44 |
| 2017/0161733 A1* | 6/2017 | Koletsky | G06Q 20/405 |
| 2018/0077144 A1 | 3/2018 | Gangawane et al. | |
| 2019/0087816 A1 | 3/2019 | Jamkhedkar et al. | |
| 2020/0007530 A1 | 1/2020 | Mohamad Abdul et al. | |
| 2020/0372494 A1 | 11/2020 | Ramanathan et al. | |

OTHER PUBLICATIONS

Written Opinion of the International Searching Authority, ddated May 28, 2021, from corresponding International Application No. PCT/US2021/017408.

Fung, Pui Ho Adonis, Mitigations of Web Application Security Risks, The Chinese University of Hong Kong, Sep. 2014, pp. 116 (Year: 2014).

* cited by examiner

SYSTEMS AND METHODS FOR PROVISIONING FUNDING CARD NUMBERS TO THIRD PARTY WALLETS

RELATED APPLICATIONS

This application is a divisional of U.S. patent application Ser. No. 16/786,812, filed Feb. 10, 2020, now U.S. U.S. Pat. No. 11,704,662, the disclosure of which is hereby incorporated, by reference, in its entirety.

BACKGROUND OF THE INVENTION

1. Field of the Invention

Embodiments generally relate to systems and methods for provisioning funding card numbers to third party wallets.

2. Description of the Related Art

It is common practice for an issuer to provision a payment token, or device primary account number ("DPAN"), to a merchant. The DPAN allows the merchant to conduct a transaction without having the actual account number (the funding primary account number, or "FPAN)". Because the FPAN is not provided, the DPAN provides additional security.

SUMMARY OF THE INVENTION

Systems, methods, and devices for provisioning funding card numbers to merchant wallets are disclosed. In one embodiment, in an information processing apparatus comprising at least one computer processor, a method for provisioning funding card numbers to third party wallets may include: (1) authenticating a customer using an electronic device; (2) redirecting the customer to a third-party website; (3) receiving, from the third-party website and via a first API, a request for funding primary account numbers (FPANs) associated with the customer; (4) providing the third-party website with a plurality of FPAN identifiers for FPANs associated with the customer; (5) receiving, from the third-party website and via a second API, a request for a FPAN associated with a selected FPAN identifier; (6) encrypting the FPAN associated with the selected FPAN identifier; and (7) communicating the encrypted FPAN to the third-party website.

In one embodiment, the method may further include providing the third-party website with an authentication token and a session key during the redirect.

In one embodiment, the FPAN identifiers may each include fewer than all digits of the FPAN.

In one embodiment, the FPAN identifiers may be encrypted

In one embodiment, the step of encrypting the FPAN associated with the selected FPAN identifier may include encrypting FPAN data associated with the selected FPAN identifier, wherein the FPAN data comprises the FPAN and at least one of an expiration date and a billing zip code.

In one embodiment, the third party may decrypt the encrypted FPAN and may store the FPAN.

According to another embodiment, in an issuer backend comprising at least one computer processor, a method for provisioning funding card numbers to third party wallets may include: (1) authenticating a customer using an electronic device accessing the issue backend using a computer program; (2) receiving, from the customer, a request to provision a FPAN to a third party; (3) launching a frame in the computer program with a website for the third party, wherein the customer logs in to the website for the third party using the frame and the third-party website generates a session identifier for a session with the customer; (4) receiving, from the third-party website, the session identifier; (5) encrypting the FPAN; and (6) communicating the encrypted FPAN to the third-party website.

In one embodiment, the computer program may include a computer application or a website.

In one embodiment, the frame may include a lightbox.

In one embodiment, the method may further include validating the session identifier.

In one embodiment, the validation may include OAUTH or SiteMinder validation.

In one embodiment, the step of encrypting the FPAN may include encrypting FPAN data associated with the FPAN, wherein the FPAN data comprises the FPAN and at least one of an expiration date and a billing zip code.

In one embodiment, the third party may decrypt the encrypted FPAN and may store the FPAN.

According to another embodiment, in an information processing apparatus comprising at least one computer processor, a method for provisioning funding card numbers to third party wallets may include: (1) receiving, from a third-party website and on behalf of a customer, an authentication request for the customer; (2) generating an access token; (3) generating a symmetric key using the access token; (4) receiving, from the third-party website and via a first API, a request for funding primary account numbers (FPANs) associated with the customer and an authentication token; (5) providing the third-party website with a plurality of FPAN identifiers for FPANs associated with the customer; (6) receiving, from the third-party website and via a second API, a request for a FPAN associated with a selected FPAN identifier and the authentication token; (7) encrypting the FPAN associated with the selected FPAN identifier with the symmetric key; and (8) communicating the encrypted FPAN to the third-party website.

In one embodiment, the FPAN identifiers each may include fewer than all digits of the FPAN.

In one embodiment, the FPAN identifiers may be encrypted

In one embodiment, the step of encrypting the FPAN associated with the selected FPAN identifier may include encrypting FPAN data associated with the selected FPAN identifier, wherein the FPAN data comprises the FPAN and at least one of an expiration date and a billing zip code.

In one embodiment, the third party may decrypt the encrypted FPAN using the symmetric key and may store the FPAN.

In one embodiment, the authentication token may include an OAUTH token.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Embodiments are directed to systems and methods for provisioning funding card numbers to merchant wallets.

Embodiments may use an API to provision funding card numbers with field level encryption using Public Key Infrastructure (PKI) to securely transport Funding Card Number between business entities (e.g., issuers, merchants, etc.). The issuer may be any issuer of the funding card (e.g., banks), and the merchant may be any ecommerce merchant.

In embodiments, third parties (e.g., FinTechs, merchants, wallet providers, etc.) may have access to the issuer's public API to present a lightbox or similar for authenticating customers and retrieving FPAN credentials.

In other embodiments, the customer may push FPAN credentials to third parties after they are authenticated by the issuer by authenticating to the merchant.

Underlying product services may be used to retrieve account information from the issuer's systems of record based on accounts associated with the customer's profile.

In embodiments, the APIs may be stateless and may be for onetime use. Thus, no life cycle or linkages are managed, and every time the customer wants to checkout or store the FPAN (e.g., card on file), the APIs may need to be invoked.

Figure 1:
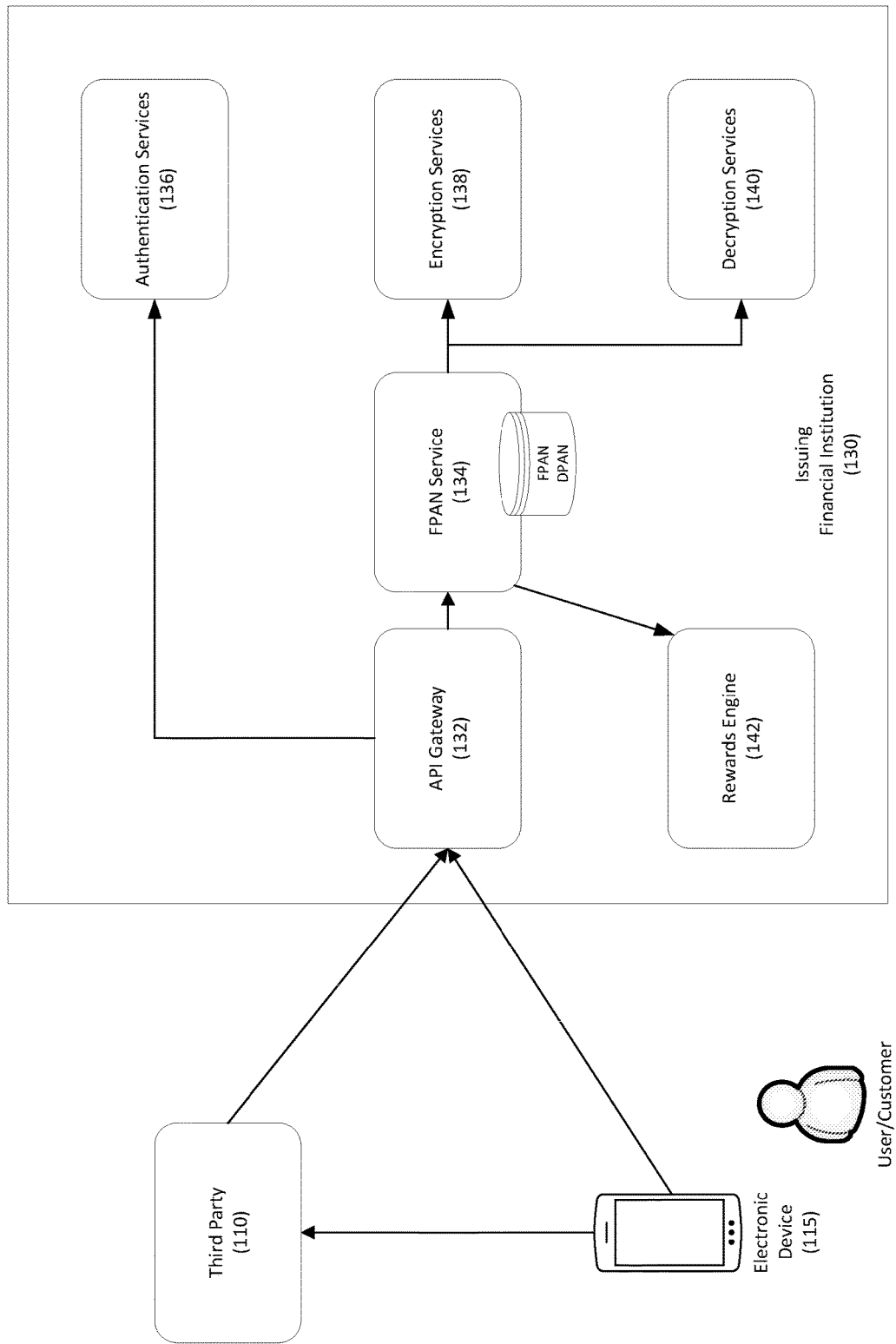
FIG. 1 discloses system provisioning funding card numbers to merchant wallets according to one embodiment.

Referring to FIG. 1, a system for provisioning funding card numbers to merchant wallets is disclosed according to an embodiment. System 100 may include third party 110, which may be any suitable e-commerce merchant, FinTech, e-wallet provider, aggregator, etc. A user or customer may interact with third party 110 using electronic device 115. The user may also interact with third party 110 using electronic device 115 via external API gateway 120.

Electronic device 115 may be any suitable electronic device, including smartphones, smart watches, desktop computers, notebook computers, laptop computers, workstations, kiosks, Internet of Things (IoT) appliances, etc.

API gateway 132 may receive FPAN provisioning requests from third party 110 and/or electronic device 115, and may route the requests to FPAN Services 134 within issuing financial institution 130.

In one embodiment, API 132 gateway may authenticate the user by calling authentication services 136.

FPAN service 134 may manage the merchant-specific controls, PKI encryption/decryption, and the gathering of data through internal services, such as encryption services 138, decryption services 140, etc.

Issuing financial institution 130 may further include rewards engine 142 that may provide an interface for the user/customer to pay for goods or services using rewards points.

Figure 2:
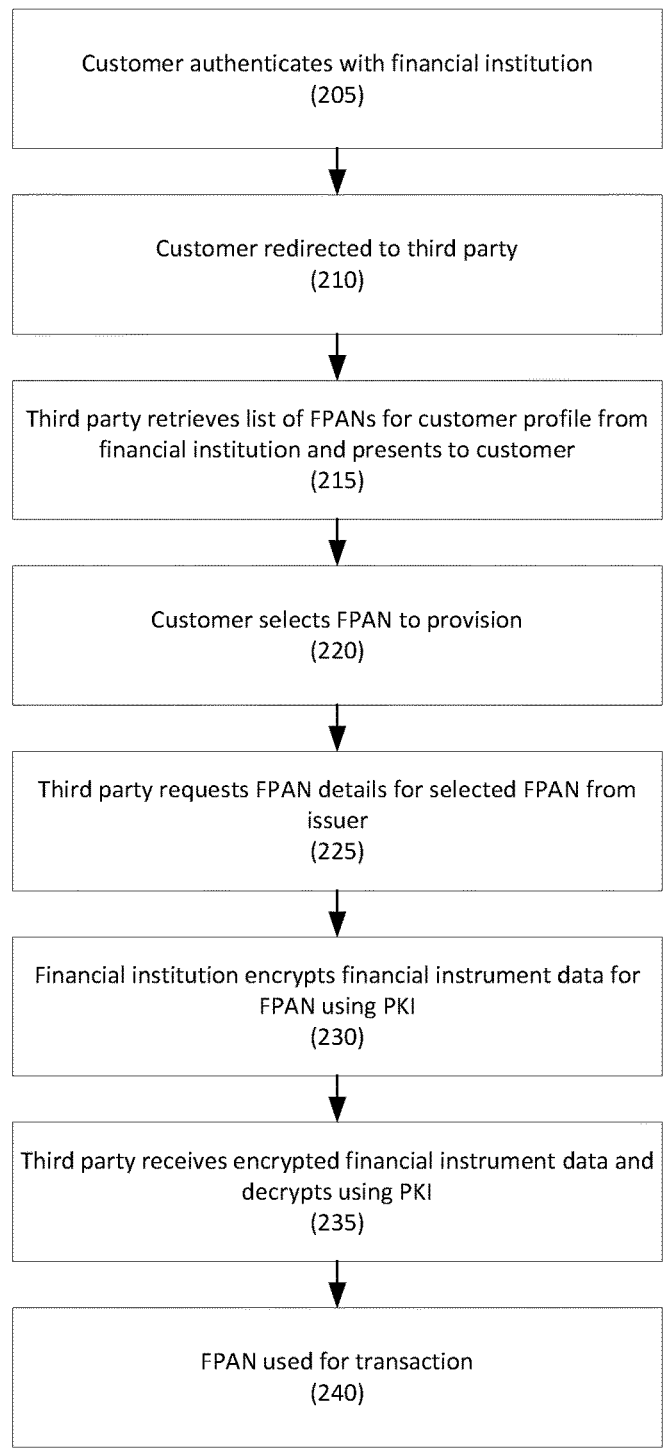
FIG. 2 discloses a method for provisioning funding card numbers to merchant wallets according to one embodiment.

Referring to FIG. 2, a method for provisioning funding card numbers to merchant wallets is disclosed according to an embodiment. In one embodiment, the method described with reference to this figure may be directed to the issuer pushing a FPAN to a third party at the request of the user or customer.

In step 205, a customer may authenticate with a financial institution (e.g., using the financial institution's mobile application, website, etc.). The user may be responding to an offer, may be accessing the financial institution's reward website, etc.

In step 210, the authenticated customer may be redirected to a website for the third party. In one embodiment, a session key that may be passed with the redirect. The session key and/or index data may be used for subsequent API calls (e.g., SAML, OAUTH, etc.).

In one embodiment, the financial institution may also send the user authentication parameters, such as an authentication token, to the third party when they are invoked. This may be transparent to user.

In step 215, at checkout, the third party may retrieve a list of FPANs for the customer and may present the list to the customer. In one embodiment, the third party may invoke an API to retrieve the list. The third party may also provide the authentication parameters received in step 210 with the API.

In one embodiment, the financial institution may return less than the entire FPAN (e.g., it may only return the last four digits of the card, card art, etc.), and may only present that information to the customer. In one embodiment, this may be encrypted.

In step 220, the customer may select one of the FPANs for provisioning to the third party, and, in step 225, the merchant may request the FPAN for the selected FPAN.

In step 230, the financial institution may encrypt the financial instrument data (e.g., card number, expiration date, billing address, etc.) for the FPAN and may provide the encrypted financial instrument data to the third party. In embodiments, at a minimum, the billing zip code may be provided.

In step 235, the third party may receive the encrypted financial instrument data and may decrypt it using PKI.

In step 240 the FPAN may be stored by the third party (e.g., for card on file transactions), or may be used for a pending transaction.

Figure 3:
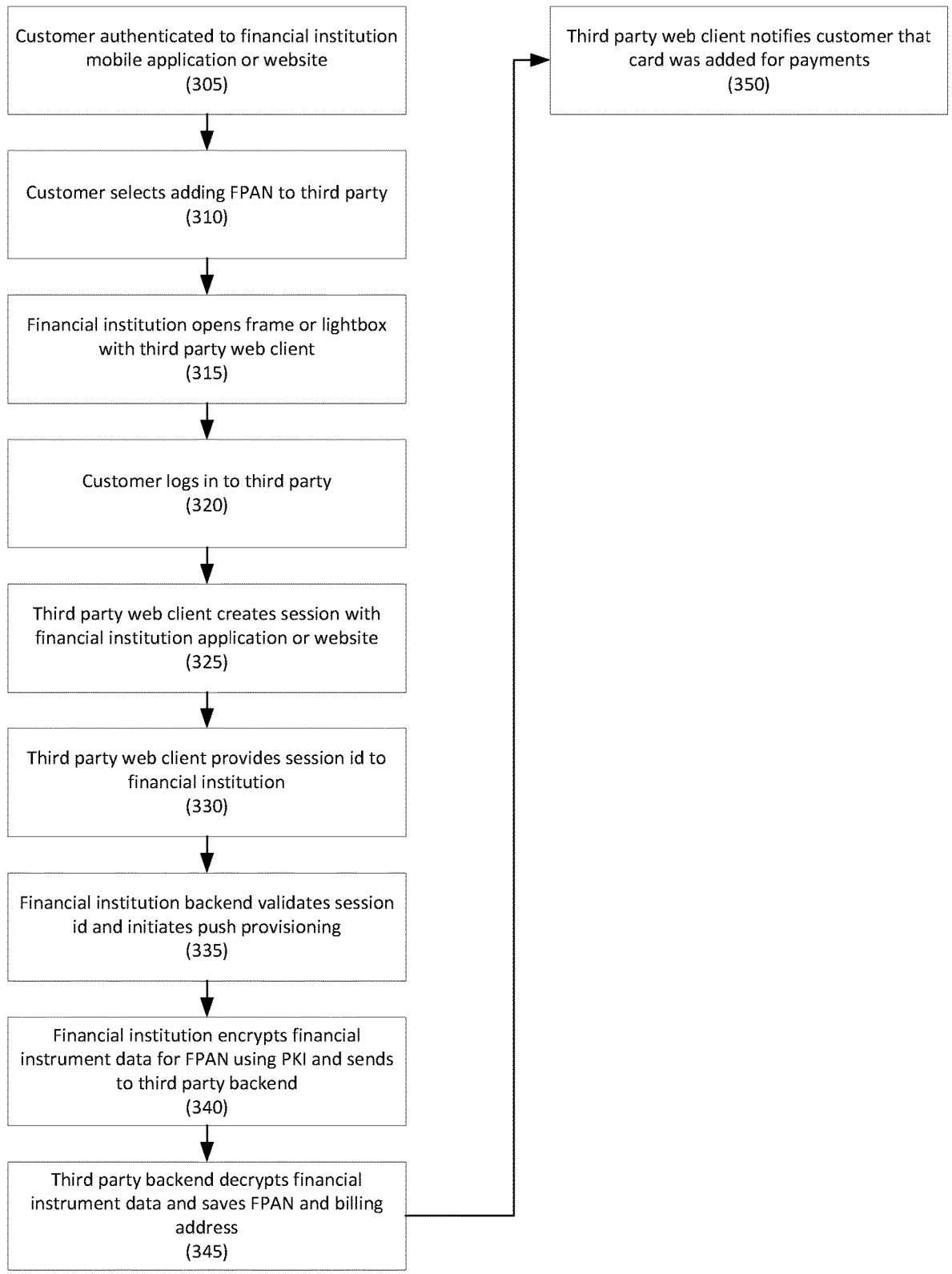
FIG. 3 discloses a method for provisioning funding card numbers to merchant wallets according to one embodiment.

Referring to FIG. 3, a method for provisioning funding card numbers to merchant wallets is disclosed according to an embodiment. In one embodiment, the method described with reference to this figure may be directed to the use of a redirect to a third party during checkout.

In step 305, a customer may authenticate with a financial institution (e.g., using the financial institution's mobile application, website, etc.). In one embodiment, the customer may be authenticated using OAUTH. Additional information (e.g., a SiteMinder ID, a hashed SiteMinder ID, etc.) may be used for additional security as is necessary and/or desired.

In step 310, the authenticated customer may select to adding a FPAN to a third party, such as a third-party payment application, a merchant, etc.

In step 315, the financial institution's mobile application or website may open a frame or lightbox with the third party's web client.

In step 320, the customer may log in to the third party using the customer's credentials with the third party.

In step 325, the third-party web client may create a session with the issuer mobile application.

In step 330, the third-party web client may provide the session identifier to the financial institution (e.g., the financial institution's backend).

In step 335, the financial institution's backend may validate the session id and may initiate push provisioning of the FPAN to the third party. In one embodiment, the validation may include OAUTH and/or SiteMinder validation In step 340, the financial institution's backend may encrypt the financial instrument data (e.g., card number, expiration date, billing address, etc.) for the FPAN, and may send the encrypted financial instrument data to the third-party backend.

In step 345, the third-party backend may decrypt the financial instrument data using PKI. The third-party backend may store the decrypted financial instrument data.

Different encryption methods may be used based on the level of third party integration. For example, PGP may be used for encryption.

In step 350, the third-party web client may notify the customer that the financial instrument has been added for card on file payments.

Figure 4:
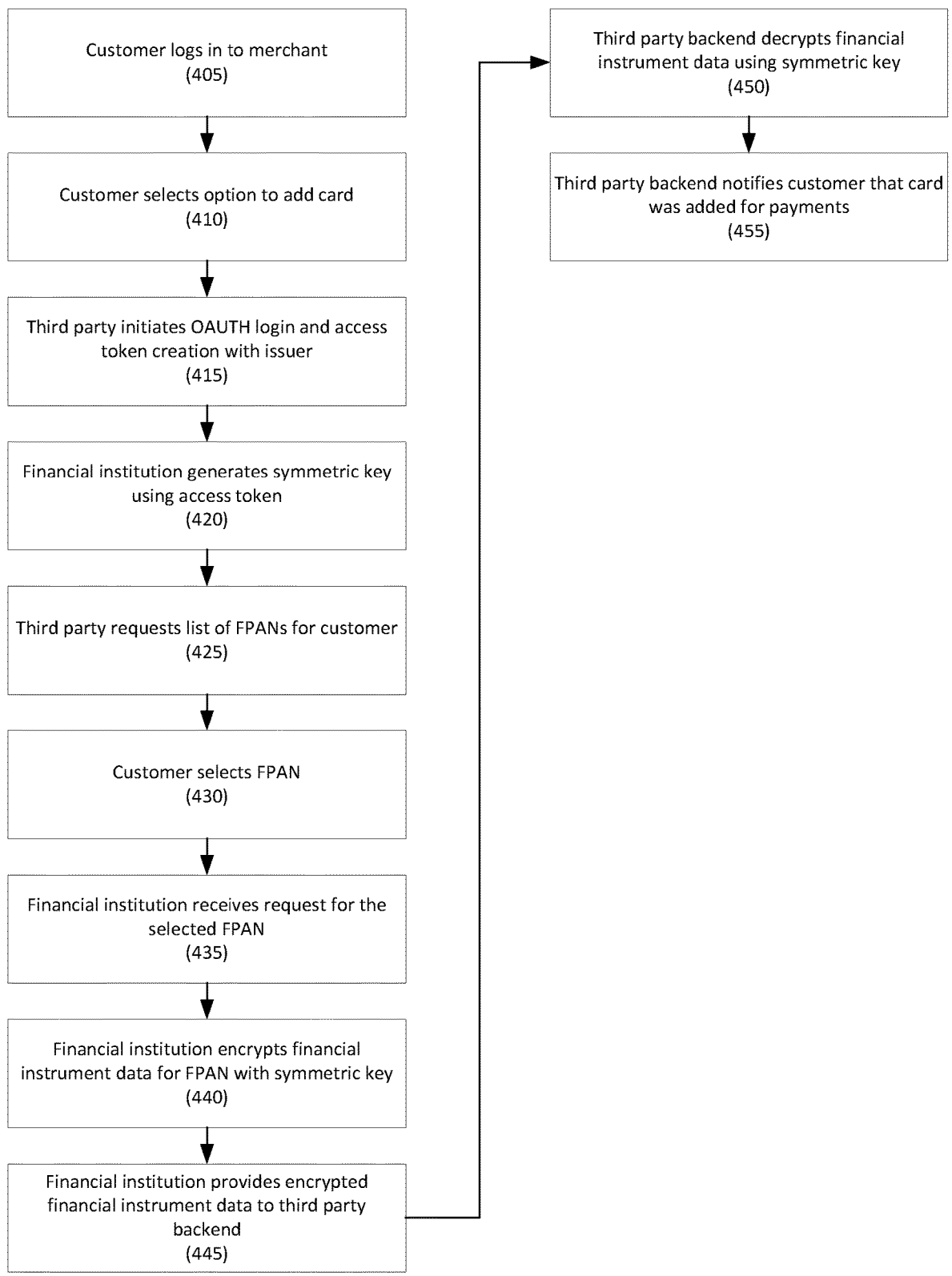
FIG. 4 discloses a method for provisioning funding card numbers to merchant wallets according to one embodiment.

Referring to FIG. 4, a method for provisioning funding card numbers to merchant wallets is disclosed according to an embodiment. In one embodiment, the method described with reference to this figure may be directed to a third party pulling the FPAN from the issuer.

In step 405, a customer may log in to an account with a third party using the customer's credentials.

In step 410, the customer may select an option to add a financial instrument from the financial institution to the third party.

In step 415, the third party may initiate OAUTH login and access token creation with the financial institution.

In one embodiment, the issuer may generate an access token. An example of such is disclosed in U.S. patent application Ser. Nos. 16/697,780 and 62/773,860 are hereby incorporated by reference in their entireties.

In step 420, the financial institution may generate a symmetric key using the access token. In one embodiment, the symmetric key may be generated using, for example, Hardware Security Module, Java Keystore, Key Management Service for additional security, in addition to the OAUTH token.

In step 425, the third party may request a list of FPANs available for provisioning. In one embodiment, the third party may use an API to retrieve the list. In one embodiment, the OAUTH, SessionID, SiteMinder ID, or similar token will identify the customer.

This may be similar to step 215, above.

In step 430, the third party may receive the list of FPANs and may present the list to the customer. The customer may then select one of the FPANs for provisioning.

In step 435, the financial institution may receive a request for the selected FPAN. In one embodiment, the request may include the profile ID for the user and the symmetric key. In another embodiment, the request may include the OAUTH, SessionID, and/or SiteMinderID token, from which the customer profile id is determined.

In step 440, the financial institution may encrypt the financial instrument data (e.g., card number, expiration date, billing address, etc.) for the FPAN using the symmetric key, and may send the encrypted financial instrument data to the third-party backend.

In step 445, the financial institution may provide the encrypted financial instrument data to the third-party backend.

In step 450, the third-party backend may decrypt the financial instrument data using the symmetric key. The third-party backend may store the decrypted financial instrument data.

In step 455, the third-party web client may notify the customer that the financial instrument has been added for card on file payments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories.

However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for provisioning funding card numbers to third party wallets, comprising:
   in an information processing apparatus comprising at least one computer processor:
   authenticating a customer using an electronic device;
   redirecting the customer to a third-party website;
   receiving, from the third-party website and via a first API, a request for funding primary account numbers (FPANs) associated with the customer;
   providing the third-party website with a plurality of FPAN identifiers for FPANs associated with the customer;
   receiving, from the third-party website and via a second API, a request for a FPAN associated with a selected FPAN identifier;
   encrypting the FPAN associated with the selected FPAN identifier; and
   communicating the encrypted FPAN to the third-party website.

2. The method of claim 1, further comprising:
   providing the third-party website with an authentication token and a session key during the redirect.

3. The method of claim 1, wherein the FPAN identifiers each comprise fewer than all digits of the FPAN.

4. The method of claim 1, wherein the FPAN identifiers are encrypted.

5. The method of claim 1, wherein the step of encrypting the FPAN associated with the selected FPAN identifier comprises:
   encrypting FPAN data associated with the selected FPAN identifier, wherein the FPAN data comprises the FPAN and at least one of an expiration date and a billing zip code.

6. The method of claim 1, wherein the third party decrypts the encrypted FPAN and stores the FPAN.

7. A system comprising at least one computer including a processor and a memory, wherein the at least one computer is configured to:
   authenticate a customer using an electronic device;
   redirect the customer to a third-party website;
   receive, from the third-party website and via a first API, a request for funding primary account numbers (FPANs) associated with the customer;
   provide the third-party website with a plurality of FPAN identifiers for FPANs associated with the customer;
   receive, from the third-party website and via a second API, a request for a FPAN associated with a selected FPAN identifier;
   encrypt the FPAN associated with the selected FPAN identifier; and
   communicate the encrypted FPAN to the third-party website.

8. The system of claim 7, wherein the at least one computer is configured to:
   provide the third-party website with an authentication token and a session key during the redirect.

9. The system of claim 7, wherein the FPAN identifiers each comprise fewer than all digits of the FPAN.

10. The system of claim 7, wherein the FPAN identifiers are encrypted.

11. The system of claim 7, wherein the at least one computer is configured to:
    encrypt FPAN data associated with the selected FPAN identifier, wherein the FPAN data comprises the FPAN and at least one of an expiration date and a billing zip code.

12. The system of claim 7, wherein a third party decrypts the encrypted FPAN and stores the FPAN.

13. A non-transitory computer readable storage medium, including instructions stored thereon, which instructions, when read and executed by one or more computer processors, cause the one or more computer processors to perform steps comprising:
    authenticating a customer using an electronic device;
    redirecting the customer to a third-party website;
    receiving, from the third-party website and via a first API, a request for funding primary account numbers (FPANs) associated with the customer;
    providing the third-party website with a plurality of FPAN identifiers for FPANs associated with the customer;
    receiving, from the third-party website and via a second API, a request for a FPAN associated with a selected FPAN identifier;
    encrypting the FPAN associated with the selected FPAN identifier; and
    communicating the encrypted FPAN to the third-party website.

14. The non-transitory computer readable storage medium of claim 13, further comprising:
    providing the third-party website with an authentication token and a session key during the redirect.

15. The non-transitory computer readable storage medium of claim 13, wherein the FPAN identifiers each comprise fewer than all digits of the FPAN.

16. The non-transitory computer readable storage medium of claim 13, wherein the FPAN identifiers are encrypted.

17. The non-transitory computer readable storage medium of claim 13, wherein the step of encrypting the FPAN associated with the selected FPAN identifier comprises:
    encrypting FPAN data associated with the selected FPAN identifier, wherein the FPAN data comprises the FPAN and at least one of an expiration date and a billing zip code.

18. The non-transitory computer readable storage medium of claim 13, wherein a third party decrypts the encrypted FPAN and stores the FPAN.

* * * * *